United States Patent
Tseng

(10) Patent No.: US 9,097,865 B2
(45) Date of Patent: Aug. 4, 2015

(54) OPTICAL COMMUNICATION DEVICE WITH PLANAR OPTICAL WAVEGUIDE

(71) Applicant: HON HAI PRECISION INDUSTRY CO., LTD., New Taipei (TW)

(72) Inventor: Kuo-Fong Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/014,412

(22) Filed: Aug. 30, 2013

(65) Prior Publication Data

US 2014/0255043 A1    Sep. 11, 2014

(51) Int. Cl.
*H04B 10/40* (2013.01)
*H04B 10/50* (2013.01)
*H04B 10/60* (2013.01)
*G02B 6/42* (2006.01)
*G02B 6/43* (2006.01)

(52) U.S. Cl.
CPC ........... *G02B 6/4214* (2013.01); *G02B 6/43* (2013.01)

(58) Field of Classification Search
CPC ........ H04B 10/00; H04B 10/12; H04B 10/25; H04B 10/801; H04B 10/802; H04B 10/803; G02B 6/43; G02B 6/12004
See application file for complete search history.

(56) References Cited

U.S. PATENT DOCUMENTS 7,000,434 B2 * 2/2006 Murali ........................... 65/386
2006/0062512 A1 * 3/2006 Lee et al. ....................... 385/15

* cited by examiner

*Primary Examiner* — Darren E Wolf
(74) *Attorney, Agent, or Firm* — Novak Druce Connolly Bove + Quigg LLP

(57) ABSTRACT

An optical communication device includes a planar optical waveguide, a first substrate, a light emitting element, and a light receiving element. The planar optical waveguide includes a top surface and a light guide portion. The light guide portion includes a first sloped surface and a second sloped surface. The first substrate includes a mounting surface. The first substrate is supported on the top surface. An end of the first substrate defines a first receiving hole. The other end of the first substrate defines a second receiving hole. The light emitting element is received in the first receiving hole and faces the first sloped surface at about a 45 degree angle. The light receiving element is received in the second receiving hole and faces the second sloped surface at about a 45 degree angle.

12 Claims, 1 Drawing Sheet

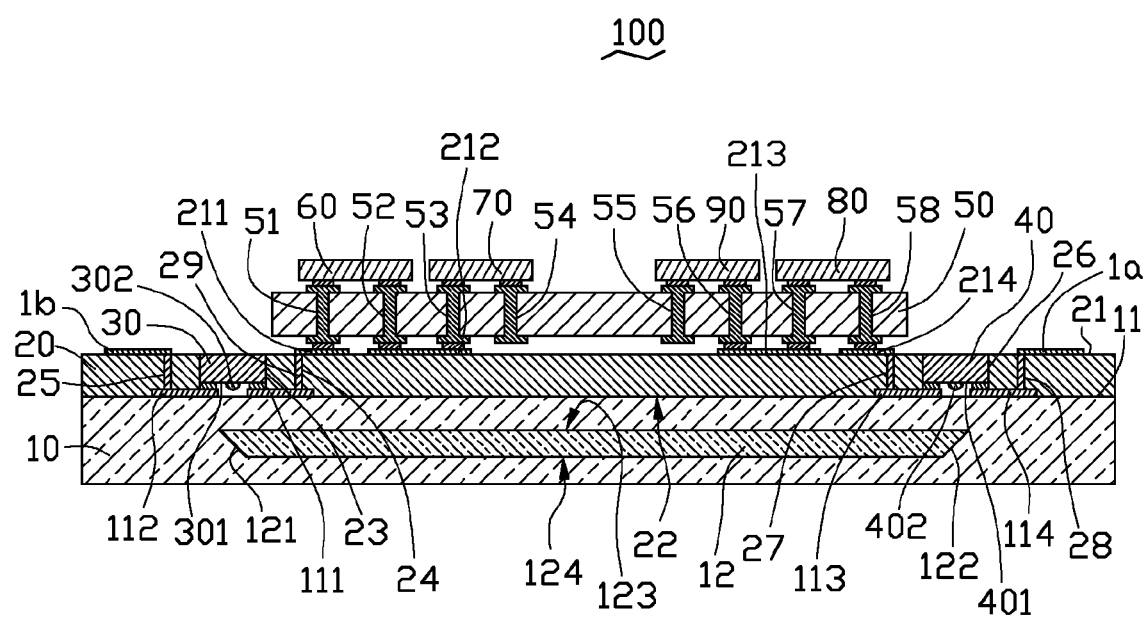

OPTICAL COMMUNICATION DEVICE WITH PLANAR OPTICAL WAVEGUIDE

BACKGROUND

1. Technical Field

The present disclosure relates to communication devices, and particularly to an optical communication device with a planar optical waveguide.

2. Description of Related Art

An optical communication device includes a photoelectric element for emitting/receiving optical signals, a driver chip for driving the photoelectric element, a light waveguide for transmitting optical signals, and a lens element for optically coupling the photoelectric element with the light waveguide. To ensure an optical transmitting efficiency of the optical communication device, the photoelectric element and the light waveguide need to be accurately aligned with the lens element. However, a complicated alignment mechanism and method is needed to align the photoelectric element and the light waveguide with the lens element, which increases a cost and assembling difficulty of the optical communication device.

Therefore, it is desirable to provide an optical communication device which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

The FIGURE is a schematic view of an optical communication device, according to an exemplary embodiment of the present disclosure.

DETAILED DESCRIPTION

The FIGURE shows an optical communication device 100, according to an exemplary embodiment. The optical communication device 100 includes a planar optical waveguide 10, a first substrate 20, a light emitting element 30, a light receiving element 40, a second substrate 50, a first controller 60, a processor 70, a second controller 80, and a storing element 90.

The planar optical waveguide 10 includes a top surface 11 and a light guide portion 12 formed in the planar optical waveguide 10. The light guide portion 12 includes a first sloped surface 121 and a second sloped surface 122. Both the first sloped surface 121 and the second sloped surface 122 are respectively on opposite ends of the light guide portion 12. The light guide portion 12 includes a first surface 123 and a second surface 124 facing away from the first surface 123. Both the first surface 123 and the second surface 124 are substantially parallel to the top surface 11. The first sloped surface 121 and the first surface 123 define an angle therebetween. In the embodiment, the angle is about 45 degrees. The second sloped surface 122 and the first surface 123 also define an angle therebetween. In the embodiment, the angle is also about 45 degrees.

The planar optical waveguide 10 includes a first connection pad 111, a second connection pad 112, a third connection pad 113, and a fourth connection pad 114. Both the first connection pad 111 and the second connection pad 112 are positioned on the top surface 11 corresponding to the first sloped surface 121. Both the third connection pad 113 and the fourth connection pad 114 are positioned on the top surface 11 corresponding to the second sloped surface 122.

The first substrate 20 is made of a material such as polyimide, ceramic, or glass fiber. The first substrate 20 includes a mounting surface 21 and a bottom surface 22 facing away from the mounting surface 21. The bottom surface 22 is supported on the top surface 11. A first end of the mounting surface 21 corresponding to the first sloped surface 121 defines a first receiving hole 23, a first through hole 24, and a second through hole 25. The first receiving hole 23, the first through hole 24, and the second through hole 25 all run through the mounting surface 21 and the bottom surface 22. The first receiving hole 23 is between the first through hole 24 and the second through hole 25.

A second end portion of the mounting surface 21 corresponding to the second sloped surface 122 defines a second receiving hole 26, a third through hole 27, and a fourth through hole 28. The first end portion of the mounting surface 21 and the second end portion of the mounting surface 21 are positioned at opposite ends of the mounting surface 21. The second receiving hole 26, the third through hole 27, and the fourth through hole 28 all run through the mounting surface 21 and the bottom surface 22. The second receiving hole 26 is between the third through hole 27 and the fourth through hole 28.

The first substrate 20 includes a fifth connection pad 211, a sixth connection pad 212, a seventh connection pad 213, and an eighth connection pad 214. Both the fifth connection pad 211 and the sixth connection pad 212 are positioned on one end of the mounting surface 21. Both the seventh connection pad 213 and the eighth connection pad 214 are positioned on another end of the mounting surface 21. The first substrate 20 also includes a first additional connection pad 1a and a second additional connection pad 1b.

The first through hole 24, the second through hole 25, the third through hole 27, and the fourth through hole 28 are all filled with a conductive element 29. One end of the conductive element 29 received in the first through hole 24 is electrically connected to the first connection pad 111, while the other end of the conductive element 29 is electrically connected to the fifth connection pad 211. One end of the conductive element 29 received in the second through hole 25 is electrically connected to the second connection pad 112, while the other end of conductive element 29 received in the second through hole 25 is exposed out of the mounting surface 21 and electrically connected to the second additional connection pad 1b. One end of the conductive element 29 received in the third through hole 27 is electrically connected to the third connection pad 113, while the other end is electrically connected to the eighth connection pad 214. One end of the conductive element 29 received in the fourth through hole 28 is electrically connected to the fourth connection pad 114, while the other end is exposed out of the mounting surface 21 and electrically connected to the first additional connection pad 1a.

The light emitting element 30 includes a light emitting surface 301, and a first light condensing lens 302 formed on the light emitting surface 301. In the embodiment, the light emitting element 30 is a laser diode (LD) and is received in the first receiving hole 23. The light emitting element 30 is electrically connected to the first connection pad 111 and the second connection pad 112 through a flip chip method. The first light condensing lens 302 is a convex lens. The light emitting surface 301 faces the first sloped surface 121 at about a 45 degree angle.

The light receiving element 40 includes a light receiving surface 401, and a second light condensing lens 402 formed on the light receiving surface 401. In the embodiment, the light receiving element 40 is a photo diode (PD) and is received in the second receiving hole 26. The light receiving element 40 is also electrically connected to the third connection pad 113 and the fourth connection pad 114 through the flip chip method. The second light condensing lens 402 is also a convex lens. The light receiving surface 401 faces the second sloped surface 122 at about a 45 degree angle.

The second substrate 50 is also made of a material such as polyimide, ceramic, or glass fiber. The second substrate 50 is positioned over the mounting surface 21 of the first substrate 20. The second substrate 50 defines a fifth through hole 51, a sixth through hole 52, a seventh through hole 53, an eighth through hole 54, a ninth through hole 55, a tenth through hole 56, an eleventh through hole 57, and a twelfth through hole 58. The fifth through hole 51, the sixth through hole 52, the seventh through hole 53, the eighth through hole 54, the ninth through hole 55, the tenth through hole 56, the eleventh through hole 57, and the twelfth through hole 58 are all filled with conductive elements 29.

One end of the conductive element 29 received in the fifth through hole 51 is electrically connected to the fifth connection pad 211. One end of the conductive element 29 received in the sixth through hole 52 is electrically connected to the sixth connection pad 212. One end of the conductive element 29 received in the seventh through hole 53 is also electrically connected to the sixth connection pad 212. One end of the conductive element 29 received in the tenth through hole 56 is electrically connected to seventh connection pad 213. One end of the conductive element 29 received in the eleventh through hole 57 is also electrically connected to the seventh connection pad 213. One end of the conductive element 29 received in the twelfth through hole 58 is electrically connected to eighth connection pad 214.

The first controller 60 is electrically connected to the other ends of the conductive elements 29 received in the fifth through hole 51 and the sixth through hole 52. The processor 70 is electrically connected to the other ends of the conductive elements 29 received in the seventh through hole 53 and the eighth through hole 54. As such, the light emitting element 30 is electrically connected to the first controller 60 and the processor 70.

In the embodiment, the storing element 90 is a flash memory, and is electrically connected to the other ends of the conductive elements 29 received in the ninth through hole 55 and the tenth through hole 56. The second controller 80 is electrically connected to the other ends of the conductive elements 29 received in the eleventh through hole 57 and the twelfth through hole 58. As such, the light receiving element 40 is electrically connected to the second controller 80 and the storing element 90.

In use, the processor 70 sends a trigger signal to the first controller 60, and the first controller 60 receives the trigger signal and generates a driving signal to drive the light emitting element 30 to emit light beams. The light beams emitted by the light emitting element 30 are condensed by the light condensing lens 302, and are directed onto the first sloped surface 121. The first sloped surface 121 bends the light beams 90 degrees, so that the light beams enter into the planar optical waveguide 10. The light beams are reflected by the second sloped surface 122 and are bent 90 degrees onto the light receiving element 40. The light receiving element 40 converts light beams received by the second light condensing lens 402 into electrical signals, and transmits the electrical signals to the second controller 80. The second controller 80 amplifies the electrical signals. The storing element 90 stores the electrical signals amplified by the second controller 80.

In other embodiments, both the first light condensing lens 302 and the second light condensing lens 402 can be omitted if the light is not required to be condensed.

In other embodiments, the conductive element 29 received in the first through hole 24 can be integrally formed with the fifth connection pad 211. The conductive element 29 received in the third through hole 27 can be integrally formed with the eighth connection pad 214.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical communication device, comprising:
a planar optical waveguide comprising a top surface and a light guide portion, the light guide portion comprising a first sloped surface and a second sloped surface opposite to the first sloped surface;
a first substrate comprising a mounting surface and a bottom surface facing away from the mounting surface, the bottom surface supported on the top surface of the planar optical waveguide, a first end portion of the mounting surface defining a first receiving hole extending through the first substrate and directly above the first sloped surface, a second end portion of the mounting surface defining a second receiving hole extending through the first substrate and directly above the second sloped surface, both the first receiving hole and the second receiving hole running through the mounting surface and the bottom surface;
a light emitting element comprising a light emitting surface, the light emitting element received in the first receiving hole and electrically connected to the first substrate, with the light emitting surface aligning with the first sloped surface; and
a light receiving element comprising a light receiving surface, the light receiving element received in the second receiving hole and electrically connected to the first substrate, with the light receiving surface aligning with the second sloped surface.

2. The optical communication device of claim 1, wherein the light emitting element comprises a first light condensing lens formed on the light emitting surface, the light receiving element comprises a second light condensing lens formed on the light receiving surface, the first light condensing lens aligns with the first sloped surface, and the second light condensing lens aligns with the second sloped surface.

3. The optical communication device of claim 2, wherein both the first light condensing lens and the second light condensing lens are convex lenses.

4. The optical communication device of claim 1, wherein the light emitting surface faces the first sloped surface at about a 45 degree angle, and the light receiving surface faces the second sloped surface at about a 45 degree angle.

5. The optical communication device of claim 1, comprising a second substrate, a processor, and a first controller, wherein the second substrate is positioned on the mounting surface, both the processor and the first controller are positioned on the second substrate, the processor is electrically connected to the first controller, the processor sends a trigger signal to the first controller, and the first controller receives the trigger signal and generates a driving signal to drive the light emitting element to emit light beams.

6. The optical communication device of claim 5, comprising a storing element and a second controller, wherein the storing element is electrically connected to the second controller, the light receiving element receives the light beams, and converts the light beams into electrical signals, and transmits the electrical signals to the second controller, the second controller amplifies the electrical signals, and the storing element stores the amplified electrical signals.

7. The optical communication device of claim 6, wherein the storing element is a flash memory.

8. The optical communication device of claim 6, wherein the planar optical waveguide comprises a first connection pad, a second connection pad, a third connection pad, and a fourth connection pad, both the first connection pad and the second connection pad are positioned on the top surface corresponding to the first sloped surface, both the third connection pad and the fourth connection pad are positioned on the top surface corresponding to the second sloped surface, the light emitting element is electrically connected to the first connection pad and the second connection pad, and the light receiving element is electrically connected to the third connection pad and the fourth connection pad.

9. The optical communication device of claim 8, wherein the first end portion of the mounting surface defines a first through hole and a second through hole, the first receiving hole is between the first through hole and the second through hole, the second end portion of the mounting surface defines a third through hole and a fourth through hole, the second receiving hole is between the third through hole and the fourth through hole, all of the first through hole, the second through hole, the third through hole, and the fourth through hole are filled with conductive elements, the first substrate comprises a fifth connection pad, a sixth connection pad, a seventh connection pad, and an eighth connection pad, both the fifth connection pad and the sixth connection pad are positioned on one end of the mounting surface, both the seventh connection pad and the eighth connection pad are positioned on the other end of the mounting surface, one end of the conductive element received in the first through hole is electrically connected to the first connection pad, the other end is electrically connected to the fifth connection pad, one end of the conductive element received in the second through hole is electrically connected to the second connection pad, the other end of the conductive element received in the second through hole is exposed out of the mounting surface, one end of the conductive element received in the third through hole is electrically connected to the third connection pad, the other end of the conductive element received in the third through hole is electrically connected to the eighth connection pad, one end of the conductive element received in the fourth through hole is electrically connected to the fourth connection pad, and the other end of the conductive element received in the fourth through hole is exposed out of the mounting surface.

10. The optical communication device of claim 9, wherein the second substrate defines a fifth through hole, a sixth through hole, a seventh through hole, an eighth through hole, a ninth through hole, a tenth through hole, an eleventh through hole, and a twelfth through hole, the fifth through hole, the sixth through hole, the seventh through hole, the eighth through hole, the ninth through hole, the tenth through hole, the eleventh through hole, and the twelfth through hole are all filled with conductive elements, one end of the conductive element received in the fifth through hole is electrically connected to the fifth connection pad, one end of the conductive element received in the sixth through hole is electrically connected to the sixth connection pad, one end of the conductive element received in the seventh through hole is also electrically connected to the sixth connection pad, one end of the conductive element received in the tenth through hole is electrically connected to the seventh connection pad, one end of the conductive element received in the eleventh through hole is also electrically connected to the seventh connection pad, and one end of the conductive element received in the twelfth through hole is electrically connected to the eighth connection pad.

11. The optical communication device of claim 10, wherein the first controller is electrically connected to the other end of the conductive element received in the fifth through hole and electrically connected to the other end of the conductive element received in the sixth through hole, and the processor is electrically connected to the other end of the conductive element received in the seventh through hole and electrically connected to the other end of the conductive element received in the eighth through hole.

12. The optical communication device of claim 10, wherein the storing element is electrically connected to the other end of the conductive element received in the ninth through hole and electrically connected to the other end of the conductive element received in the tenth through hole, and the second controller is electrically connected to the other end of the conductive element received in the eleventh through hole and electrically connected to the other end of the conductive element received in the twelfth through hole.

\* \* \* \* \*